(12) United States Patent
Sasson et al.

(10) Patent No.: US 12,259,819 B2
(45) Date of Patent: Mar. 25, 2025

(54) REACTIVE DEEP-FROZEN ADAPTIVE REPLACEMENT CACHE AND DRIVE INTERFACE

(71) Applicant: INTERNATIONAL BUSINESS MACHINES CORPORATION, Armonk, NY (US)

(72) Inventors: Ben Sasson, North Baddesley (GB); Roderick Guy Charles Moore, Bournemouth (GB); Lee Jason Sanders, Chichester (GB); Paul Nicholas Cashman, Alton (GB)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 18/116,586

(22) Filed: Mar. 2, 2023

(65) Prior Publication Data
US 2024/0256461 A1   Aug. 1, 2024

(30) Foreign Application Priority Data
Feb. 1, 2023 (GB) ...................................... 2301414

(51) Int. Cl.
G06F 12/0891 (2016.01)
(52) U.S. Cl.
CPC ................................ G06F 12/0891 (2013.01)
(58) Field of Classification Search
CPC .................................................. G06F 12/0891
See application file for complete search history.

(56) References Cited

U.S. PATENT DOCUMENTS

| | | |
|---|---|---|
| 6,996,676 B2 | 2/2006 | Megiddo |
| 8,725,939 B1 | 5/2014 | Clark |
| 9,641,378 B1 | 5/2017 | Steffen |
| 9,733,854 B2 | 8/2017 | Sharma |
| 9,952,771 B1 | 4/2018 | Bigman |
| 11,841,859 B1 * | 12/2023 | Shrivastava ............ G06F 16/22 |
| 2017/0060772 A1 | 3/2017 | Krishnappa |

(Continued)

OTHER PUBLICATIONS

Wikipedia, "Adaptive replacement cache," Wikipedia—The Free Encyclopedia, Accessed: Feb. 7, 2023, https://en.wikipedia.org/wiki/Adaptive_replacement_cache, 3 pages.

(Continued)

*Primary Examiner* — Sean D Rossiter
(74) *Attorney, Agent, or Firm* — Jordan T. Schiller (57) ABSTRACT

A method, system, and computer program product for managing a storage system, comprising: analyzing an access request for a first storage block of the set of storage blocks; in response to the access request comprising a read request: in response to the first storage block residing in the cache: processing the read request from the cache; promoting the first storage block within the cache; and destaging the first storage block to the storage device with the first compression ratio; and in response to the first storage block not residing in the cache: processing the read request from the storage device; and copying the first storage block to the cache; in response to the access request comprising a write request: writing the first storage block to the cache; and destaging the first storage block to the storage device using the first compression ratio.

17 Claims, 5 Drawing Sheets

(56) References Cited

U.S. PATENT DOCUMENTS

2020/0241805 A1\* 7/2020 Armangau ............ G06F 3/0659
2021/0117132 A1   4/2021 Vankamamidi
2021/0132861 A1\* 5/2021 Liu ...................... G06F 3/0653
2021/0191658 A1   6/2021 Mizushima
2022/0342766 A1\* 10/2022 Brun-Cottan ....... G06F 11/1458

OTHER PUBLICATIONS

Sasson et al., "Reactive Deep-Frozen Adaptive Replacement Cache and Drive Interface", GB Application No. 2301414.5, Filed Feb. 1, 2023, 27 pages.
GB Search Report, Application No. GB2301414.5, mailing date: Jun. 30, 2023, 3 pages.

\* cited by examiner

REACTIVE DEEP-FROZEN ADAPTIVE REPLACEMENT CACHE AND DRIVE INTERFACE

BACKGROUND

The invention relates generally to storage and, more specifically, provides a method, system, and computer program product suitable for managing a storage system.

Modern storage systems have access to more than one cache algorithm. While traditional caching uses Least Recently Used (LRU), some modern and more efficient implementations are using, for example, Adaptive Replacement Cache (ARC) or other algorithms that take frequency and usefulness into account to reduce the chances of a non-intentionally cache-hostile Input/Output (I/O) workload impacting overall system performance.

A cache algorithm maintains entries in a cache. When a cache is full, the algorithm decides which entry should be deleted. One popular algorithm is LRU, which deletes the least recently used items first. The LRU algorithm requires keeping track of what was used and when. An ordered list of resource entries is kept in the cache, wherein the order is based on the time of the most recent access. New entries enter at the top once the bottom entry has been removed. If an entry already exists in the cache (a cache "hit"), that entry moves to the top.

In contrast, Least Frequently Used (LFU) counts how often an item is needed. The item least often used is discarded first.

U.S. Pat. No. 6,996,676 B2 Megiddo, N. et al. ("System and Method for Implementing an Adaptive Replacement Cache Policy", Feb. 7, 2006) discloses an adaptive replacement cache policy which dynamically maintains two lists of pages, a recency list and a frequency list, in addition to a cache directory. The policy keeps these two lists to roughly the same size, the cache size. Together, the two lists remember twice the number of pages that would fit in the cache. At any time, the policy selects a variable number of the most recent pages to exclude from the two lists. The policy adaptively decides, in response to an evolving workload, how many top pages from each list to maintain in the cache at any given time. It achieves such online, on-the-fly adaptation by using a learning rule that allows the policy to track a workload quickly and effectively. This allows the policy to balance between recency and frequency in an online and self-tuning fashion, in response to evolving and possibly changing access patterns. The policy is also scan-resistant. It allows one-time-only sequential read requests to pass through the cache without flushing pages that have temporal locality. The policy is extremely simple to implement and requires only constant-time overhead per request. The policy has negligible space overhead.

In ARC, both frequently used, and recently used pages plus a recent eviction history for both are recorded. The IBM® DS8000® storage controllers uses ARC. ARC both frequently used and recently used pages plus a recent eviction history for both are recorded. The IBM® DS8000® storage controllers uses ARC.

Some modern drives implement internal compression algorithms. It is not unrealistic for a drive to support more than one algorithm at the same time, choosing which one to use for a certain write based on internal logic.

Some modern disks, such as IBM® FlashCore Modules (FCM), implement internal, hardware-based compression algorithms. It is not unrealistic for a disk to support more than one algorithm at the same time, choosing which one to use for a certain write based on internal logic. The different compression algorithms will have different characteristics of compressibility and speed of compression. The higher the compression ratio, the longer the disk takes to compress. Different compression algorithms can be used for different copies of the same data, so that on reading that data an appropriate copy can be used matching specified performance characteristics. However this can lead to an unbalanced systems in terms of performance.

Therefore, there is a need in the art to address the aforementioned problem.

SUMMARY

According to the present invention, a method, a system, and a computer program product are provided, according to the independent claims.

Viewed from a first aspect, the present invention provides a computer implemented method for managing a storage system, the storage system comprising a storage device, and a cache, wherein the storage device comprises a first compression ratio, a second compression ratio, and a set of storage blocks, the first compression ratio higher than the second compression ratio, the method comprising: analyzing an access request for a first storage block of the set of storage blocks; in response to the access request comprising a read request: in response to the first storage block residing in the cache: processing the read request from the cache; promoting the first storage block within the cache; and destaging the first storage block to the storage device with the first compression ratio; and in response to the first storage block not residing in the cache: processing the read request from the storage device; and copying the first storage block to the cache; in response to the access request comprising a write request: writing the first storage block to the cache; and destaging the first storage block to the storage device using the first compression ratio.

Viewed from a further aspect, the present invention provides a system for managing a storage system, the storage system comprising a storage device, and a cache, wherein the storage device comprises a first compression ratio, a second compression ratio, and a set of storage blocks, the first compression ratio higher than the second compression ratio, the system comprising: an analyze component for analyzing an access request for a first storage block of the set of storage blocks; responsive to the access request comprising a read request: responsive to the first storage block residing in the cache: a cache read/write component for processing the read request from the cache; a cache control component for promoting the first storage block within the cache; and the cache read/write component further operable for destaging the first storage block to the storage device with the first compression ratio; and responsive to the first storage block not residing in the cache: a device read/write component for: processing the read request from the storage device; and for copying the first storage block to the cache; responsive to the access request comprising a write request: the cache read/write component for writing the first storage block to the cache; and the device read/write component for destaging the first storage block to the storage device using the first compression ratio.

Viewed from a further aspect, the present invention provides a computer program product for managing a storage system, the computer program product comprising a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

Preferably, the present invention provides a method, system, computer program product and computer program, the method further comprising, in response to the cache deleting a second storage block, hydrating the second storage block from the first compression ratio to the second compression ratio.

Preferably, the present invention provides a method, system, computer program product and computer program, further comprising, in response to the cache determining that a third storage block is frequently used, freezing the third storage block from the second compression ratio to the first compression ratio.

Preferably, the present invention provides a method, system, computer program product and computer program, wherein the cache comprises a first list and a second list, and wherein promoting the first storage block comprises moving the first storage block from the first list to the second list, and copying the first storage block to the cache comprises copying the first storage block to the first list.

Preferably, the present invention provides a method, system, computer program product and computer program, wherein the cache is an adaptive replacement cache (ARC), the first list comprises a recency list, and the second list comprises a frequency list.

Preferably, the present invention provides a method, system, computer program product and computer program, wherein the set of storage blocks is stored in the first compression ratio and in the second compression ratio.

Preferably, the present invention provides a method, system, computer program product and computer program, wherein the set of storage block stored in the first compression ratio are stored in a first storage device, and the set of storage block stored in the second compression ratio are stored in a second storage device.

Preferably, the present invention provides a method, system, computer program product and computer program, wherein the set of storage blocks stored in the first compression ratio is in a copy relationship with the set of storage blocks in the second compression ratio.

Advantageously, the invention combines a cache algorithm and compression capabilities in a modern storage system environment to best utilize the HW and SW available.

Having a drive that supports two different compression algorithms, one faster but less space-efficient and the second slower but more compact, a drive can store two versions of the write compressed using both algorithms. The drive can then track the access to the data and choose which compression algorithm best suites the data chunk. Advantageously, communicating this information back to the controller caching algorithm allows efficiencies. When a drive ages and maximum compression is applied to the data internally, the cache can be signaled to keep the data available in cache. This negates the slower access time of the higher compressed data as the cache is more likely to have the data accessible and no need to actually read and decompress the data. Alternatively, but using similar principles, if data is tracked in system cache and known to be frequently used, cache can signal to the drive that this data can be maximally compressed as it is resident, and will remain resident, in cache. Data that is highly compressed on the drive but falls out of favor of being resident in cache (it ages off frequently used or least recently used lists), can be signaled to the drive that it can be rehydrated from maximal compression to less compressed format and thus will have better response time if it is ever read again.

BRIEF DESCRIPTION OF THE SEVERAL VIEWS OF THE DRAWINGS

The present invention will now be described, by way of example only, with reference to preferred embodiments, as illustrated in the following figures.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
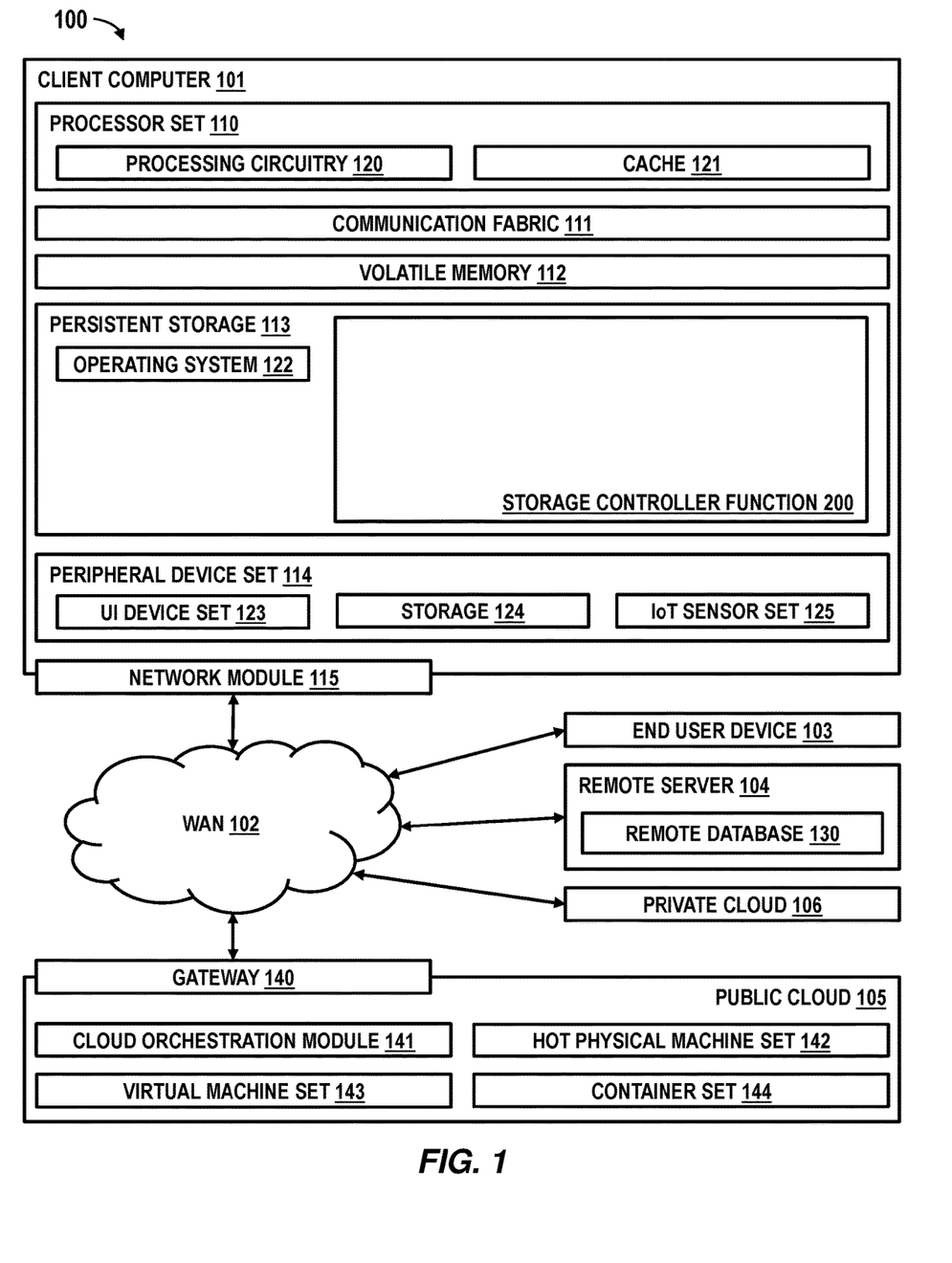
FIG. 1 depicts a computing environment 100, according to an embodiment of the present invention.

FIG. 1 depicts a computing environment 100. Computing environment 100 contains an example of an environment for the execution of at least some of the computer code involved in performing the inventive methods, such as software functionality 200 for an improved storage controller 310. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard disk, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A logical unit number (LUN) is a unique identifier for identifying a collection of physical or logical storage. A LUN can reference a single disk, a partition of disks, or an entire RAID array. Logical block addressing (LBA) is a method for specifying a location of blocks of data on storage devices.

Small Computer System Interface (SCSI) a set of command set standards for physically connecting and transferring data between computers and peripheral devices, such as disks. SCSI is available in a number of interfaces, for example, SSA, 1 Gbit Fibre Channel (1GFC), SAS. SCSI can be parallel or serial. The skilled person would understand that there are other command sets and interfaces. Another example is NVM Express (NVMe) or Non-Volatile Memory Host Controller Interface Specification (NVMHCIS), which is an interface specification for accessing a computer's non-volatile storage media usually attached via PCI Express (PCIe) bus.

In the storage subsystems of IBM® DS8000® series, IBM Storwize®, and IBM FlashSystem, the SAS protocol is used for the internal disks. The storage subsystems have controllers that provide the required hardware adapters for host connectivity to the subsystem. RAID adapters are used to create a virtual disk or logical unit number (LUN) that is configured in one of the supported RAID levels with multiple SAS hard disks based on the level of RAID used. Various levels of RAID of available to configure internal SAS HDDs or SDDs. IBM, DS8000, Storwize, FlashCopy are trademarks of International Business Machines Corporation, registered in many jurisdictions worldwide Embodiments of the present invention combines the use of different compression strategies on storage devices that contain copies of data. An example of a storage device is a storage disk, for example, IBM® FlashCore Modules (FCM). Embodiments will be described in terms of block storage technology but are equally applicable to other technologies such as file storage technology.

Compression can be implemented without impacting the existing environment and can be used with other storage processes, such as mirrored volumes and Copy Services functions. Compressed volumes provide an equivalent level of availability as regular volumes. When reading a compressed block from a disk, data is uncompressed. Compressed read block performance can vary between disk types, however, IBM FCM disks provide similar compressed block read performance between different compression algorithms. Indeed, read performance of LZ compression can be higher for the higher compression ratios because the CPU needs to process less compressed data than with lower compression ratios. Presently, FCM's have a fixed compression algorithm, but there are other disks with a variable compression algorithm. Indeed, areas containing uncompressed data can be considered as having a compression value of zero, with a compression ratio of 1:1.

Figure 2:
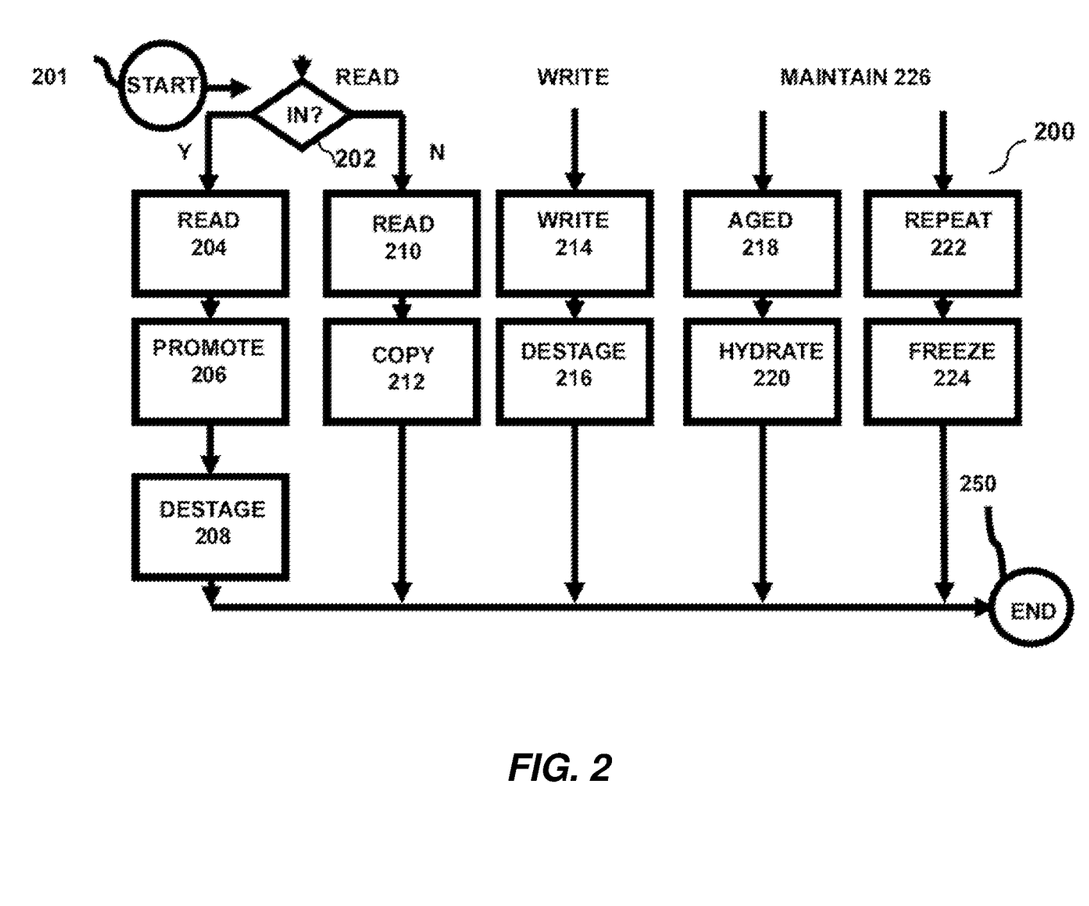
FIG. 2 depicts a high-level exemplary schematic flow diagram 200 depicting operation methods steps for updating cache metadata when reading/writing a storage volume in a storage array, according to a preferred embodiment of the present invention.
Figure 3:
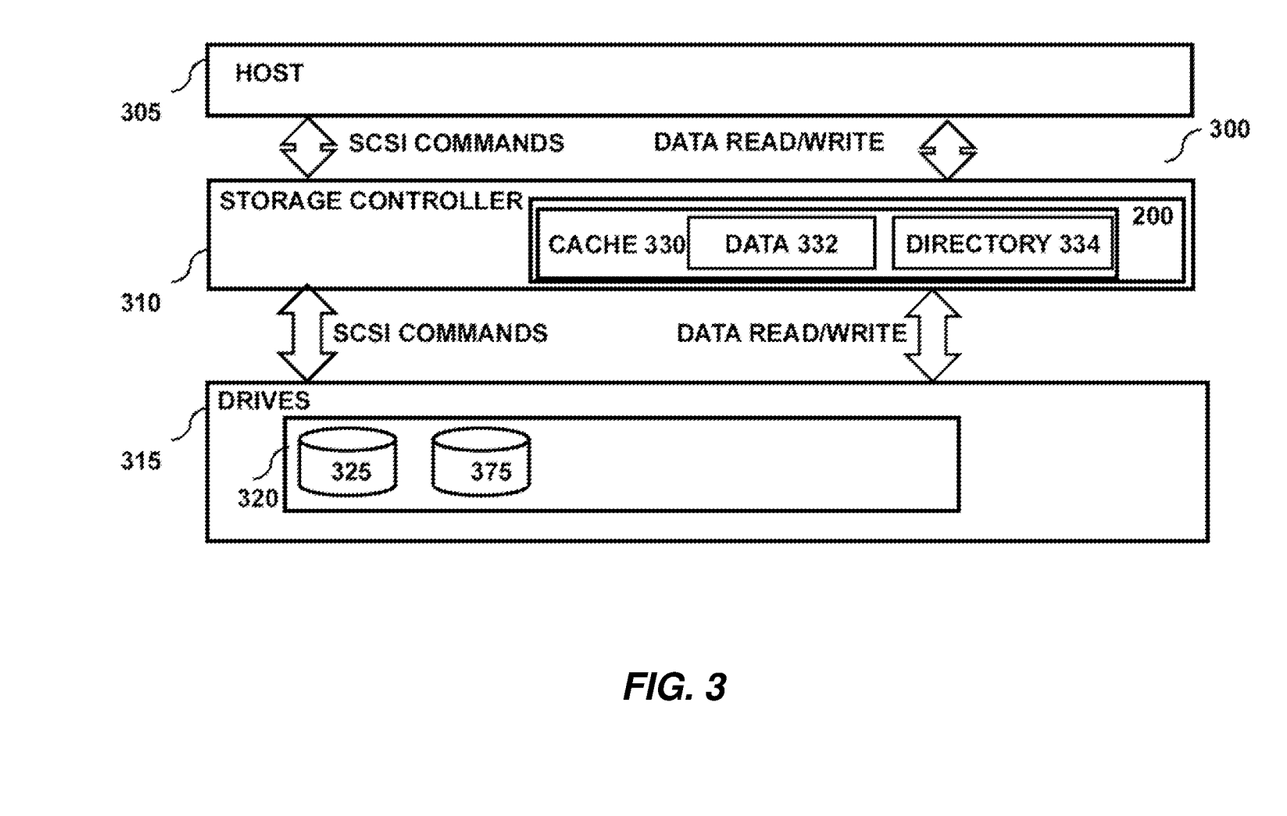
FIG. 3 depicts a high-level exemplary schematic diagram 300 depicting a computer system, according to a preferred embodiment of the present invention.
Figure 4:
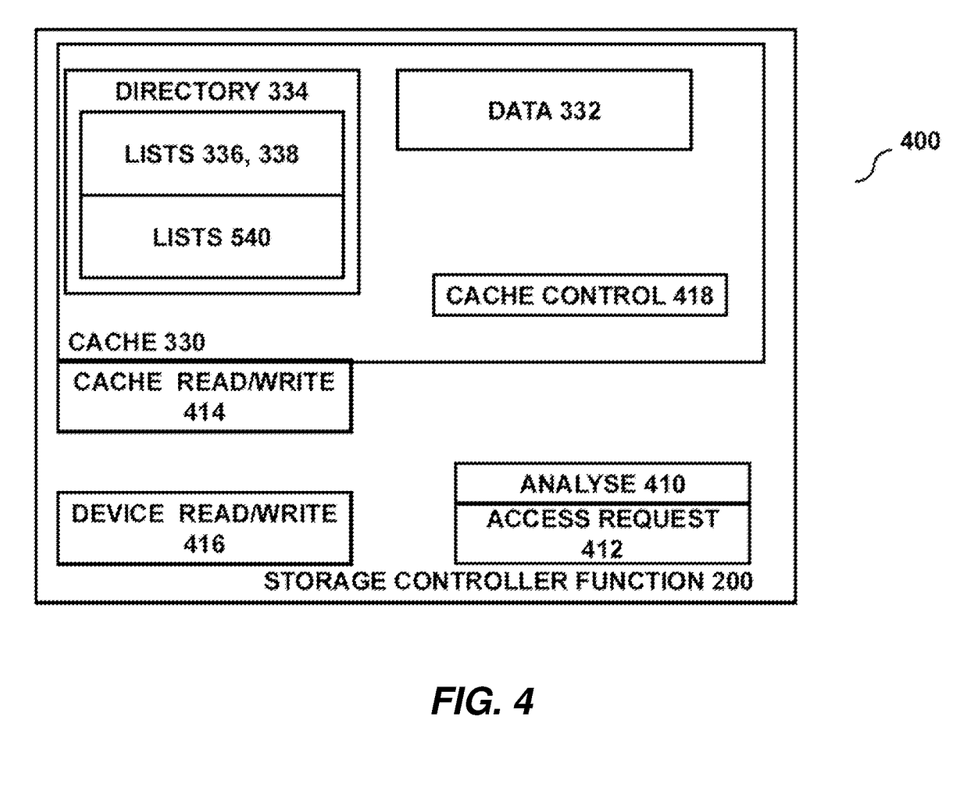
FIG. 4 depicts an exemplary schematic diagram 400 of software elements, according to a preferred embodiment of the present invention.
Figure 5:
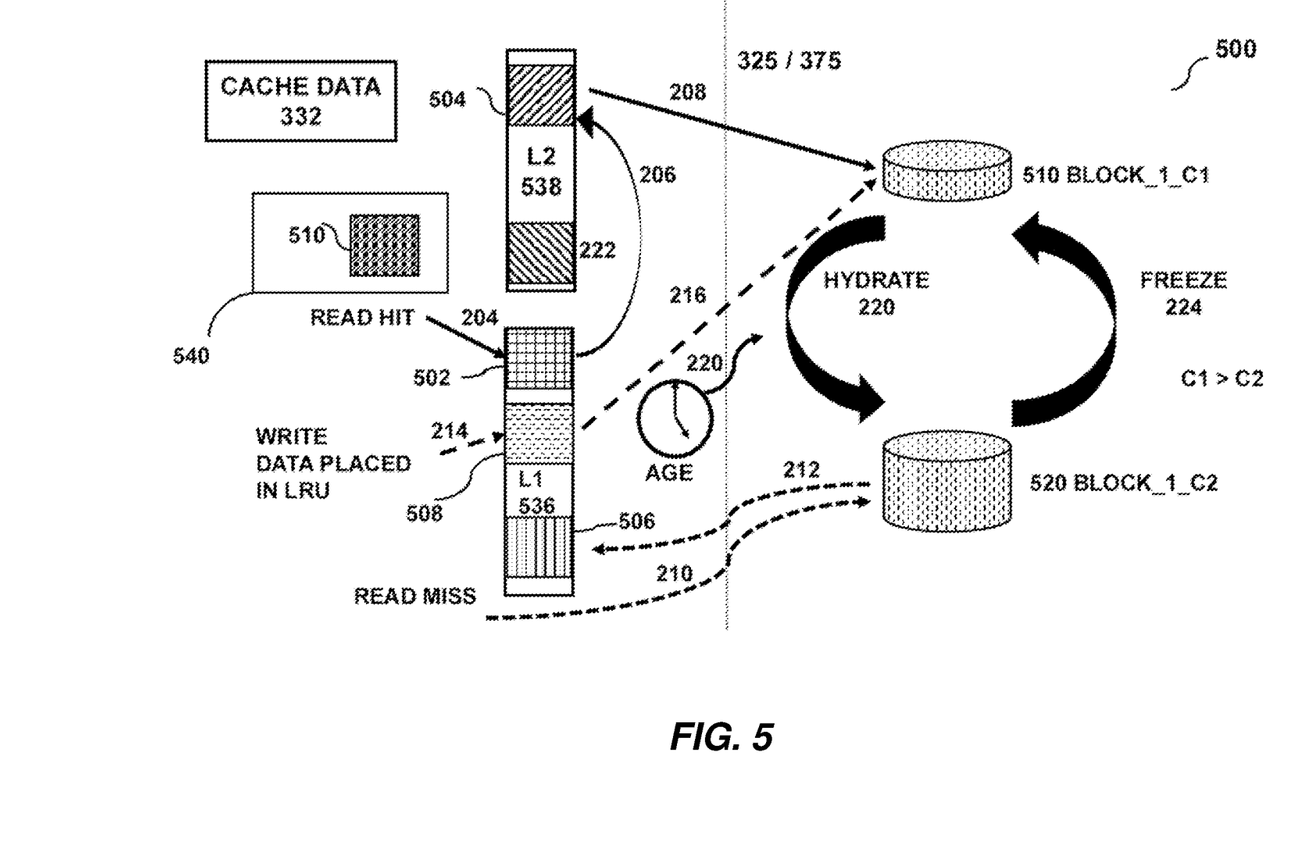
FIG. 5 depicts a high-level exemplary schematic diagram 500 depicting a computer system, according to a preferred embodiment of the present invention.

FIG. 2, which should be read in conjunction with FIGS. 3 to 5, depicts a high-level exemplary schematic flow diagram 200 depicting operation methods steps for updating cache metadata when reading/writing a storage volume in a storage array, according to a preferred embodiment of the present invention.

FIG. 3 depicts a high-level exemplary schematic diagram 300 depicting a computer system, according to a preferred embodiment of the present invention. FIG. 3 depicts a host 305, a storage controller 310, and a disk enclosure 315. The storage controller 310 also comprises software functionality 200, comprising a stack of components, for example a cache component 330. The enclosure 315 comprises the two storage disks 325, 375 within an array 320. The commands are passed between the host 305, storage controller 310 and disk enclosure 315 using SCSI commands. If a cache 330 is available, data is written to the cache 330 and destaged to the disks according to a cache algorithm. For reads, data is first read from the cache 330, and only if not present (known as a cache miss), the data is read from the disks. Data is read and written across the depicted interfaces.

Embodiments of the invention will be described in a context of an ARC cache. An ARC cache comprises cache data 332, and cache control comprising cache directory 334. The cache directory comprises two lists for recently (L1) and frequently (L2) referenced entries. Each list also comprises an additional list (T1, T2, respectively) that track entries recently evicted from its parent list. Entries in L1 and L2 correspond to data that is in the cache data component 332. T1 and T2 only contain keys for entries, and not the data itself. The skilled person would understand that the alternative embodiments would also apply to other cache algorithms other than ARC.

In an ARC cache, entries are made to the one end of one of other of the lists, eventually being evicted out of the other end as the entries are replaced by newer entries.

The skilled person would understand that in the case of a cache hit, the relevant data would be in the cache 330. The skilled person would also understand that the underlying storage devices 325, 375 could represent logical entities, for example, RAID arrays.

FIG. 4 depicts an exemplary schematic diagram 400 of software elements, according to a preferred embodiment of the present invention.

FIG. 5 depicts a high-level exemplary schematic diagram 500 depicting a computer system, according to a preferred embodiment of the present invention. Arrows between cache 330 and storage devices 325, 375 depict reads/writes of data referenced in the lists L1 536, L2 538 of the cache directory 334. Data referenced in the lists L1 536, L2 538 of the cache directory 334 also reside in the cache data component 332. Arrows depicted in the figures represent SCSI command and read/write data paths.

Data can be written to a storage device 325, using several compression ratios. If there is sufficient available storage space, data can be written in both higher compressed form and in a lesser compressed form. The higher compressed form is slower, but more compact. The lesser compressed form is faster, but less space-efficient. By monitoring the access pattern of the data, the method can determine that due to infrequent access it is more efficient to only keep highly compressed version of the data. In contrast, due to frequent access, the method determines that the faster, less compressed version should be used. Any reads of the data can signal to the system cache which compression type it came from.

The term "frozen" will be used to signify that data is in the higher compression ratio, and to "freeze" to signify that data is compressed from lower to higher compression ratio. The term "hydrated" will be used to signify that data is in the lower compressed form, and "hydrate" used to signify uncompressed from higher to lower compression ratio. Data read from the storage device 325, 375 is uncompressed from either the higher or lower compression ratio. Data written to the storage device 325, 375 is compressed into either the higher or lower compression ratio. The skilled person would understand that the compression/decompression function could be performed in the storage controller 310 or the host 305.

Infrequent reading of specific data from the drive may be because the specific data was resident in system cache in the past. Such data can be frozen by the drive. Adding a signal from the drive indicates to the system cache that it is preferable to keep such slower/maximally compressed data in cache. The drive can also keep monitoring for changes in access behavior that may indicate that this data is being accessed frequently enough that it would benefit from hydrating the data to allow for faster reads. If space is available again both versions of the data could be maintained until it is decided which version should be kept.

Upon write all data by default is "in cache". How long it stays in cache is dependent on how often it is updated or re-read to keep it available. Many caches use simple Least Recently Used (LRU) algorithms, each time data is read it moves to the top of the list. The list ages data off the bottom of the list. The size of the cache and the length of time data stays in cache is dictated by the length of list that is supported. More modern algorithms, such as ARC, also exist to keep track of frequently used items alongside the LRU. The benefit being, for example, a large amount of sequential write data that would never be reread cannot eject everything else from cache. Frequently used data should stay resident in cache for longer and as it is resident it would never actually be read from the disk. As such the disk can and should apply maximal compression to save space. If the system ages a frequent piece of data from cache, it should signal to the drive that should hydrate this data to be uncompressed such that it can be read back faster. This provides a balance of optimal access and optimal space efficiency.

The method starts at step 201. An analyze component 410 of the storage controller 310 analyzes an access request 412 for a storage block. In response to the access request comprising a read request, at step 202 the cache 330 determines whether an entry 502 for the storage block resides in the cache 330 by analyzing the directory 334. If the storage block resides in the cache 330, at step 204, a cache read/write component 414 reads the storage block to the host 305. This path signifies a "cache hit". At step 206, a cache control component 418 promotes 206 the entry 502 within the cache lists 536, 538. In the ARC cache of the embodiment, the entry 502 is promoted 206 to position 504 within the L2 list 538 designating that the storage block has been read more than once from the cache 330. At step 208, a device read/write component 416 destages the storage block by writing to the storage device 325, 375 with higher compression ratio C1. Alternatively, if the storage block has already been destaged to the storage device 325, 375 under lower compression ratio C2, the storage block is frozen 224 by higher compression ratio C1.

In response to the storage block not residing in the cache 330, at step 210, the device read/write component 416 reads the storage block from the storage device 325, 375. With storage device compression/decompression, the storage device 325, 375 decompresses the storage block to allow the read/write component 416 to read the storage block. This path signifies a "cache miss". Under embodiments of the invention, data not in the cache 330 is stored on the storage device 325, 375 under the lower compression ratio C2.

At step 212, the read storage block is copied to the cache data 332, and an entry 506 is made to the list L1 536.

Returning to step 201, the cache 330 determines that, in response to the access request comprising a write request, at step 214 the cache read/write component 414 writes the storage block to the cache data 332, and places an entry 508 in the directory 334 in the L1 536 list. At step 216, the device read/write component 416 destages the storage block by writing to the storage device 325, 375 with higher compression ratio C1.

Returning again to step 201, in response to the access request comprising a write request, at step 214 the cache read/write component 414 writes the storage block to the cache data 332, and also places an entry 508 in the directory 334 in the L1 536 list. At step 216, the device read/write component 416 destages the storage block by writing to the storage device 325, 375 with higher compression ratio C1.

The method 200 also comprises cache maintenance steps 226. The maintenance steps allow cache 330 to signal to the storage device 325, 375 about which type of compression to use based on its status in cache. At step 218 the cache control component 418 determines that an entry 510 has been deleted from the L1 536 or L2 538 lists into one of the T1/T2 lists 540. At step 220, in response to the cache 330 deleting a second storage block 510, the cache control component 418 signals the storage device 325, 375 to hydrate the second storage block from the higher compression ratio C1 to the lower compression ratio C2. In the event that the event 510 was deleted from the L1 536 list, the second storage block may already be compressed using lower compression ratio C2, in which case no hydrating is necessary.

Returning to the start of the maintenance steps 226, at step 222, the cache control component 418 determines that an entry 502 is frequently used, for example, the entry 502 has been promoted from the L1 536 list to the L2 538 lists. At step 224, the third storage block is frozen from the lower compression ratio C2 to the higher compression ratio C1. Method steps 222 and 224 may also be carried out as part of the write steps 214, 216.

At step 250, the method 200 ends.

The method allows for an initial write to store data using higher compression ratio C1, with entry in L1 536. In a subsequent access to data, the entry moves to L2 538, signaling storage device 325, 375 to freeze the data in higher compression ratio C1, as the data is likely to stay in the cache. As data ages out of the L2 538 list, the storage device 325 375 is signaled to hydrate the data in case it is reread, giving better read response times. If data is reread, storage device 325 375 maintains the data under lower compression ratio C2. When data is reread from a cache hit and system moves data to the L2 538 list, the system indicates to the storage device 325 375 that this data is in L2 538 list and it can be deep frozen as it is likely to stay in cache with less need to be read from the storage device 325 375.

There is also has the benefit of this interaction between storage device 325 375 and the cache 330. In the event of a system level cache loss, a read of data from the storage device 325 375 can indicate to the system that the data was read from either lower compression ratio C2, or the higher compression ration C1. This knowledge can be used to indicate that this data may be better suited to be added to the L2 338 list or L1 336 list, respectively. This allows the system to recover to a more tuned optimal cache behavior more quickly rather than having to wait for access patterns to drive the cache distribution of the data.

In an alternative embodiment, at step 201A (not depicted), in response to the access request comprising a write request, the cache 330 determines first whether an entry 502 for the storage block already resides in the cache 330 by analysing the directory 334.

If the entry 502 for the storage block does not reside in cache, at step 214A (not depicted) the cache read/write component 414 writes the storage block to the cache data 332, and places an entry 508 in the directory 334 in the L1 536 list. At step 216A (not depicted), the device read/write component 416 destages the storage block by writing to the storage device 325, 375 with higher compression ratio C1. However, if the entry 502 for the storage block does reside in cache, at step 214A the cache read/write component 414 re-writes the storage block to the cache data 332, and promotes the entry 502 within the L1 536 list, because in an ARC cache, only reads result in promotions to the L2 328 list.

The skilled person would understand that attention is needed to synchronize cache entries with storage device blocks. Cache lines and pages are marked as "dirty" until the corresponding data is destaged to the storage device 325, 375.

In an alternative embodiment, a storage device 325, 375 has sufficient spare storage that two copies of a data block are stored. One copy BLOCK_1_C2 520 is stored using lower compression ratio C2, and the other copy BLOCK_1_C1 510 is stored using higher compression ratio C1. A similar method 200B (not depicted) to that of method 200 is followed with some important differences. At step 208B (not depicted) unless the data marked as dirty, an entry need not be destaged to the storage device 325, 375, because the storage device 325, 375 already contains a copy in the higher compression ratio block BLOCK_1_C1 510 and a copy in the lower compression ratio block BLOCK_1_C2 520.

At step 210B (not depicted), the device read/write component 416 reads the storage block from the faster lower compression ratio block BLOCK_1_C2 520 of the storage device 325, 375.

At step 214B (not depicted) the cache read/write component 414 writes the storage block to the cache data 332, and places an entry 508 in the directory 334 in the L1 536 list. At step 216B (not depicted), the device read/write component 416 destages the storage block by writing to the storage device 325, 375 with higher compression ratio C1 and with lower compression ratio C2.

In this alternative embodiment, in maintenance steps 226B (not depicted) hydrate 220 and freeze 224 operations are not necessarily needed. However, regular synchronisation will be necessary to ensure data integrity.

In this alternative embodiment, the storage device 325, 375 carries out regular checks to ensure that there is sufficient space to maintain two copies. In the event of insufficient space, method 200B reverts to method 200. After synchronisation between copies BLOCK_1_C1 510, BLOCK_1_C2 520, and cache destaging, one copy is deleted. The storage device 325, 375 is maintained as in method 200.

In an alternative embodiment, copies are maintained using an advanced copy function. Advanced copy function is a software layer (not depicted) within the storage controller 310 stacked above the cache 330. "IBM Remote mirror and copy" feature, which is a storage feature that constantly updates a target copy of a volume so that it matches changes that were made to its associated source volume. IBM Remote mirror and copy does not capture the state of the source volume at some point in time, but rather reflects all changes that were made on the source volume to the target volume.

IBM Global Copy provides an asynchronous long-distance copy option where write operations to a storage unit at a production site are considered complete before they are transmitted to a storage unit at your recovery site. IBM Metro Mirror functions provides a synchronous long-distance copy option that constantly updates a secondary copy of a volume to match changes made to a source volume. Writes to the production site are only considered complete when transmitted to a storage unit at the recovery site.

Many computer systems use a redundant array of independent disks (RAID) for data storage purposes. This allows for improved data transfer rates over a single disk access, and provides error correction, data protection and disk redundancy. Disks are also known as 'disk drives', or simply 'drives'.

RAID systems are disk array storage systems created to provide large storage areas, fast access times and rate, and redundancy for data protection. For example, data can be mirrored across two or more disks, so if one disk fails, the data is available from the remaining disks. Alternatively, data can be spread over multiple disks allowing concurrent reading of data. Data parity can also be provided in a further disk, so if one disk fails, data can be recreated from the remaining disks. RAID systems are controlled by a RAID controller, which is a hardware unit that configures a RAID array and provides a RAID layer, so that to a using computer system, a disk array appears as a logical, single disk.

Within a RAID array system there is typically spare capacity or disks that can be used when there is a problem with one or more of the array member disks. This spare capacity can be used for spare takeover when one disk fails as the new disk capacity can be written to, using a data read from the other RAID member disks as part of the array rebuild process. One example is RAID 1, which provides data mirrored between two storage devices 325, 375.

In an alternative embodiment, as storage block is stored in one of two areas (not depicted) of the storage device 325, 375. One area is designated as a higher compression area, and the other area as a lower compression area. Storage blocks stored in these areas are automatically compressed to the compression ratios C1, C2, respectively. In the above description, a storage block freeze operation 224 comprises moving the storage block from lower compression ratio area to higher compression ratio area, and storage block hydrate operation 220 comprises moving the storage block from higher compression ratio area to lower compression ratio area.

In an alternative embodiment, more than two compression ratios are supported by the storage device 325, 375. A compression ratio for a particular storage block is dependent on where in the cache 330 an entry for the particular storage block is located. The more frequent and/or more recently used an entry is, the higher the compression ratio is.

In alternative embodiments, other cache algorithms are applied. Frequently accessed entries and/or entries unlikely to be deleted from the cache 330 are maintained in a higher compression ratio C1. Rarely accessed entries and/or entries at risk of cache deletion or entries deleted from the cache are maintained on the storage device 325, 375 in a lower compression ratio C2.

In an alternative embodiment, a different interface is used, for example NVMe.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein. It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above invention may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

Moreover, the same or similar reference numbers are used throughout the drawings to denote the same or similar features, elements, or structures, and thus, a detailed explanation of the same or similar features, elements, or structures will not be repeated for each of the drawings. The terms "about" or "substantially" as used herein with regard to thicknesses, widths, percentages, ranges, etc., are meant to denote being close or approximate to, but not exactly. For example, the term "about" or "substantially" as used herein implies that a small margin of error is present. Further, the terms "vertical" or "vertical direction" or "vertical height" as used herein denote a Z-direction of the Cartesian coordinates depicted in the drawings, and the terms "horizontal," or "horizontal direction," or "lateral direction" as used herein denote an X-direction and/or Y-direction of the Cartesian coordinates depicted in the drawings.

Additionally, the term "illustrative" is used herein to mean "serving as an example, instance or illustration." Any embodiment or design described herein is intended to be "illustrative" and is not necessarily to be construed as preferred or advantageous over other embodiments or designs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For the avoidance of doubt, the term "comprising", as used herein throughout the description and claims is not to be construed as meaning "consisting only of".

The invention claimed is:

1. A computer-implemented method for managing a storage system, the storage system comprising a storage device, and a cache, wherein the storage device comprises a first compression ratio, a second compression ratio, and a set of storage blocks comprising a first storage block and a second storage block, the first compression ratio higher than the second compression ratio, the method comprising:

analyzing an access request for the first storage block of the set of storage blocks;
in response to the access request comprising a read request:
in response to the first storage block residing in the cache:
processing the read request from the cache;
promoting the first storage block within the cache; and
destaging the first storage block to the storage device with the first compression ratio; and
in response to the first storage block not residing in the cache:
processing the read request from the storage device; and
copying the first storage block to the cache;
in response to the access request comprising a write request:
writing the first storage block to the cache; and
destaging the first storage block to the storage device using the first compression ratio;
synchronizing the cache entries with the set of storage blocks;
deleting one copy of the cache entry on the set of storage blocks; and
in response to the deletion,
hydrating the second storage block from the first compression ratio to the second compression ratio.

2. The computer-implemented method of claim 1, further comprising:
in response to the cache determining that a third storage block is frequently used, freezing the third storage block from the second compression ratio to the first compression ratio.

3. The computer-implemented method of claim 1, wherein the cache comprises a first list and a second list, and wherein promoting the first storage block comprises moving the first storage block from the first list to the second list, and copying the first storage block to the cache comprises copying the first storage block to the first list.

4. The computer-implemented method of claim 1, wherein the cache is an adaptive replacement cache (ARC), the first list comprises a recency list, and the second list comprises a frequency list.

5. The computer-implemented method of claim 1, wherein the set of storage blocks is stored in the first compression ratio and in the second compression ratio.

6. The computer-implemented method of claim 5, wherein the set of storage blocks stored in the first compression ratio are stored in a first storage device, and the set of storage blocks stored in the second compression ratio are stored in a second storage device.

7. The computer-implemented method of claim 5, wherein the set of storage blocks stored in the first compression ratio is in a copy relationship with the set of storage blocks in the second compression ratio.

8. A system for managing a storage system, the storage system comprising a storage device, and a cache, wherein the storage device comprises a first compression ratio, a second compression ratio, and a set of storage blocks comprising a first storage block and a second storage block, the first compression ratio higher than the second compression ratio, the system comprising:
an analyze component for analyzing an access request for a first storage block of the set of storage blocks;
responsive to the access request comprising a read request:
responsive to the first storage block residing in the cache:
a cache read/write component for processing the read request from the cache;

a cache control component for promoting the first storage block within the cache; and the cache read/write component further operable for destaging the first storage block to the storage device with the first compression ratio; and responsive to the first storage block not residing in the cache:

a device read/write component for: processing the read request from the storage device;

and for copying the first storage block to the cache;

responsive to the access request comprising a write request:

the cache read/write component for writing the first storage block to the cache; and the device read/write component for destaging the first storage block to the storage device using the first compression ratio;

the cache read/write component for synchronizing the cache entries with the set of storage blocks;

the cache read/write component for deleting one copy of the cache entry on the set of storage blocks; and responsive to the deletion, the device read/write component for hydrating the second storage block from the first compression ratio to the second compression ratio.

9. The system of claim 8, further comprising:
in response to the cache determining that a third storage block is frequently used, freezing the third storage block from the second compression ratio to the first compression ratio.

10. The system of claim 8, wherein the cache comprises a first list and a second list, and wherein the promote component is further operable for moving the first storage block from the first list to the second list, and the device read/write component is further operable for copying the first storage block to the first list.

11. The system of claim 8, wherein the cache is an adaptive replacement cache (ARC), the first list comprises a recency list, and the second list comprises a frequency list.

12. The system of claim 8, wherein the set of storage blocks is stored in the first compression ratio and in the second compression ratio.

13. The system of claim 8, wherein the set of storage blocks stored in the first compression ratio are stored in a first storage device, and the set of storage blocks stored in the second compression ratio are stored in a second storage device.

14. The system of claim 13, wherein the set of storage blocks stored in the first compression ratio is in a copy relationship with the set of storage blocks in the second compression ratio.

15. A computer program product for managing a storage array in a storage system, the computer program product comprising: a computer readable storage medium readable by a processing circuit and storing instructions for execution by the processing circuit for performing a method, the method comprising:

analyzing an access request for a first storage block of the set of storage blocks, wherein the set of storage blocks comprise a first storage block and a second storage block;

in response to the access request comprising a read request:

in response to the first storage block residing in the cache:
processing the read request from the cache;
promoting the first storage block within the cache; and
destaging the first storage block to the storage device with the first compression ratio; and in response to the first storage block not residing in the cache:
processing the read request from the storage device; and
copying the first storage block to the cache;

in response to the access request comprising a write request:
writing the first storage block to the cache; and
destaging the first storage block to the storage device using the first compression ratio;

synchronizing the cache entries with the set of storage blocks;
deleting one copy of the cache entry on the set of storage blocks; and
in response to the deletion,
hydrating the second storage block from the first compression ratio to the second compression ratio.

16. The computer program product of claim 15, further comprising:
in response to the cache determining that a third storage block is frequently used, freezing the third storage block from the second compression ratio to the first compression ratio.

17. The computer program product of claim 15, wherein the cache comprises a first list and a second list, and wherein promoting the first storage block comprises moving the first storage block from the first list to the second list, and copying the first storage block to the cache comprises copying the first storage block to the first list.

* * * * *